(12) United States Patent
McDuff

(10) Patent No.: US 8,974,166 B2
(45) Date of Patent: *Mar. 10, 2015

(54) WALL ANCHOR

(71) Applicant: Cobra Fixations Cie Ltee-Cobra Anchors Co. Ltd., Montreal (CA)

(72) Inventor: Pierre McDuff, Outremont (CA)

(73) Assignee: Cobra Fixations Cie Ltee-Cobra Anchors Co. Ltd., Montreal (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/858,317

(22) Filed: Apr. 8, 2013

(65) Prior Publication Data

US 2014/0037401 A1     Feb. 6, 2014

Related U.S. Application Data

(63) Continuation of application No. 12/487,500, filed on Jun. 18, 2009, now Pat. No. 8,414,239, which is a continuation of application No. 10/548,112, filed as application No. PCT/CA2004/000329 on Mar. 4, 2004, now abandoned.

(30) Foreign Application Priority Data

Mar. 4, 2003   (CA) ..................................... 2420722

(51) Int. Cl.
  *F16B 15/02*   (2006.01)
  *F16B 15/00*   (2006.01)
  *F16B 45/00*   (2006.01)

(52) U.S. Cl.
  CPC ................. *F16B 15/00* (2013.01); *F16B 45/00* (2013.01); *Y10S 411/921* (2013.01)
  USPC ........... 411/485; 411/457; 411/470; 411/487; 411/488; 411/489; 411/499; 411/921

(58) Field of Classification Search
  USPC ......... 411/485, 457, 470, 487, 488, 489, 499, 411/921
  See application file for complete search history.

(56) References Cited

U.S. PATENT DOCUMENTS

147,343 A   2/1874  Miles
165,206 A   7/1875  Brown
(Continued)

FOREIGN PATENT DOCUMENTS

CA   1164333 A1   3/1984
CA   2252173 A1   4/2000
(Continued)

OTHER PUBLICATIONS

International Search Report for PCT/CA2004/000311 mailed Jul. 14, 2004.

(Continued)

*Primary Examiner* — Roberta Delisle
(74) *Attorney, Agent, or Firm* — Ungaretti & Harris LLP

(57) ABSTRACT

A device (H) to be mounted to a friable wall (W) comprises a body (10) and at least one main saber tooth (12) extending rearwardly from an upper portion of the body (10) and adapted to be driven into the wall (W) for securing the device (H) thereto. The main saber tooth (12) is arcuate and has a pointed rear free end (22), and is adapted to be arcuately driven into the wall (W). An arcuate and pointy secondary saber tooth (14) extends rearwardly from a lower portion of the body (10) for insertion into the wall (W) before the main saber tooth (12) is inserted therein. The main saber tooth (12) defines a lower enlarged, and typically flat, load-bearing surface (30) for bearing against material of the wall (W). The main saber tooth (12) includes an upper transversely curved surface (32). A hook member (20) is provided on a front part of the body (10) for suspending items therefrom once the device (H) has been mounted to the wall (W).

15 Claims, 3 Drawing Sheets

(56) References Cited

U.S. PATENT DOCUMENTS

| | | |
|---|---|---|
| 365,725 A | 6/1887 | Buckland |
| 600,255 A | 3/1898 | Breul |
| 738,074 A | 9/1903 | Schick |
| 739,512 A | 9/1903 | Stannard |
| 745,722 A | 12/1903 | Jung |
| 1,100,170 A | 6/1914 | Brosius |
| 1,115,800 A | 11/1914 | Froberg |
| 1,132,414 A | 3/1915 | White |
| 1,159,420 A | 11/1915 | Rubly |
| 1,161,268 A | 11/1915 | Tuck |
| 1,185,587 A | 5/1916 | Bragg |
| 1,210,610 A | 1/1917 | Dehn |
| 1,333,692 A | 3/1920 | Wester |
| 1,389,540 A | 8/1921 | Washington |
| 1,409,291 A | 3/1922 | Giroux |
| 1,573,557 A | 2/1926 | Alexander |
| 1,637,981 A | 8/1927 | Baldwin |
| 1,670,398 A | 5/1928 | Silvino |
| 1,676,197 A | 7/1928 | Marrinan |
| 1,780,474 A | 11/1930 | Glazer |
| 1,802,934 A | 4/1931 | Balch |
| 1,999,575 A | 4/1935 | Reuter et al. |
| 2,193,306 A | 3/1940 | Tinnerman |
| 2,282,631 A | 5/1942 | Winship |
| 2,339,841 A | 1/1944 | Deuchler et al. |
| D170,196 S | 8/1953 | Gries |
| 2,698,470 A | 1/1955 | Buedingen |
| 2,751,807 A | 6/1956 | Harre |
| 2,883,946 A | 4/1959 | Kleef |
| 2,908,196 A | 10/1959 | Apfelzweig |
| 2,916,235 A | 12/1959 | Nagel |
| 3,020,602 A | 2/1962 | Siering |
| 3,127,807 A | 4/1964 | Modrey |
| 3,143,915 A | 8/1964 | Tendler |
| 3,248,994 A | 5/1966 | Mortensen |
| 3,268,195 A | 8/1966 | Hoffman |
| 3,282,547 A | 11/1966 | Ables |
| 3,288,014 A | 11/1966 | Aackersberg |
| 3,298,651 A | 1/1967 | Passer |
| 3,385,156 A | 5/1968 | Polos |
| 3,547,389 A | 12/1970 | Mitchell |
| 3,618,447 A | 11/1971 | Goins |
| 3,645,163 A | 2/1972 | Byland |
| 3,707,898 A | 1/1973 | Holly |
| 3,752,030 A | 8/1973 | Steurer |
| 3,861,631 A | 1/1975 | Shorin |
| 3,879,006 A | 4/1975 | Staudte, Jr. |
| 3,891,176 A | 6/1975 | Downing et al. |
| 3,895,773 A | 7/1975 | Solo |
| 3,912,211 A | 10/1975 | Topf |
| 3,926,394 A | 12/1975 | Mauceri et al. |
| 3,966,157 A | 6/1976 | Corral et al. |
| 4,043,245 A | 8/1977 | Kaplan |
| 4,075,924 A | 2/1978 | McSherry et al. |
| 4,103,854 A | 8/1978 | Pliml et al. |
| 4,120,231 A | 10/1978 | Neumayer |
| 4,181,061 A | 1/1980 | McSherry |
| 4,196,883 A | 4/1980 | Einhorn et al. |
| D259,700 S | 6/1981 | Chasen |
| 4,274,324 A | 6/1981 | Giannuzzi |
| 4,285,264 A | 8/1981 | Einhorn |
| 4,286,497 A | 9/1981 | Shamah |
| 4,294,156 A | 10/1981 | McSherry et al. |
| 4,300,745 A | 11/1981 | Peterson |
| 4,325,528 A | 4/1982 | Martin |
| 4,406,108 A | 9/1983 | Beck et al. |
| 4,422,608 A | 12/1983 | Hogg |
| 4,485,995 A | 12/1984 | Hogg |
| 4,509,713 A | 4/1985 | Hogg |
| 4,573,844 A | 3/1986 | Smith |
| 4,613,108 A | 9/1986 | Sundstrom et al. |
| 4,619,430 A | 10/1986 | Hogg |
| 4,650,386 A | 3/1987 | McSherry et al. |
| 4,664,350 A | 5/1987 | Dodds et al. |
| 4,697,969 A | 10/1987 | Sparkes |
| 4,719,917 A | 1/1988 | Barrows et al. |
| 4,821,992 A | 4/1989 | Johnson |
| 4,822,226 A | 4/1989 | Kennedy |
| 4,828,439 A | 5/1989 | Giannuzzi |
| D301,975 S | 7/1989 | Mullen |
| 4,871,140 A | 10/1989 | Hoskinson et al. |
| 5,028,030 A | 7/1991 | Lewis |
| 5,048,788 A | 9/1991 | Lorincz |
| 5,059,077 A | 10/1991 | Schmid |
| 5,067,864 A | 11/1991 | Dewey et al. |
| 5,149,037 A | 9/1992 | Smith |
| 5,215,418 A | 6/1993 | Trainer et al. |
| 5,221,169 A | 6/1993 | McSherry et al. |
| 5,236,293 A | 8/1993 | McSherry et al. |
| D339,980 S | 10/1993 | Sheehan |
| 5,267,718 A | 12/1993 | Sheehan |
| 5,267,719 A | 12/1993 | Keller |
| 5,308,203 A | 5/1994 | McSherry et al. |
| 5,322,401 A | 6/1994 | Vernet |
| 5,437,429 A | 8/1995 | Atlas |
| 5,447,005 A | 9/1995 | Giannuzzi |
| 5,529,449 A | 6/1996 | McSherry et al. |
| 5,536,121 A | 7/1996 | McSherry |
| 5,584,462 A | 12/1996 | Reese |
| 5,596,792 A | 1/1997 | Shelton |
| D378,052 S | 2/1997 | Perreault |
| D381,892 S | 8/1997 | Porter et al. |
| 5,702,218 A | 12/1997 | Onofrio |
| 5,725,302 A | 3/1998 | Sirkin |
| 5,752,792 A | 5/1998 | McSherry |
| 5,755,545 A | 5/1998 | Banks |
| 5,833,415 A | 11/1998 | McSherry |
| D404,287 S | 1/1999 | Hepworth |
| 5,876,169 A | 3/1999 | Wrigley |
| 5,878,988 A | 3/1999 | Rakower |
| 5,881,982 A | 3/1999 | Hollingsworth et al. |
| D409,082 S | 5/1999 | Donahue |
| 5,944,295 A | 8/1999 | McSherry |
| D417,385 S | 12/1999 | Bries et al. |
| 6,036,149 A | 3/2000 | Del Pino et al. |
| D424,816 S | 5/2000 | Snell |
| 6,126,126 A | 10/2000 | McKiernan, Jr. |
| 6,250,865 B1 | 6/2001 | McSherry |
| 6,279,862 B1 | 8/2001 | Gershowitz |
| D457,419 S | 5/2002 | McSherry et al. |
| 6,419,436 B1 | 7/2002 | Gaudron |
| 6,431,510 B1 | 8/2002 | Lydecker et al. |
| 6,435,789 B2 | 8/2002 | Gaudron |
| D462,895 S | 9/2002 | Gaudron |
| 6,457,926 B1 | 10/2002 | Pope |
| D473,451 S | 4/2003 | Goodman et al. |
| D480,292 S | 10/2003 | Johansson et al. |
| D480,625 S | 10/2003 | Snell |
| D486,057 S | 2/2004 | Chen |
| 6,695,276 B2 | 2/2004 | Skorka |
| D493,699 S | 8/2004 | Goodman et al. |
| D494,452 S | 8/2004 | Sheldon et al. |
| 6,821,069 B2 | 11/2004 | Ikuta |
| 6,830,228 B2 | 12/2004 | Ernst |
| 6,884,012 B2 | 4/2005 | Panasik |
| 6,969,220 B2 | 11/2005 | Anquetin |
| D515,911 S | 2/2006 | McDuff |
| D516,412 S | 3/2006 | McDuff |
| 7,160,074 B2 | 1/2007 | Ernst et al. |
| D554,481 S | 11/2007 | Newbould et al. |
| D554,483 S | 11/2007 | Hager et al. |
| D557,595 S | 12/2007 | Ernst et al. |
| 7,320,569 B2 | 1/2008 | Kaye et al. |
| D566,532 S | 4/2008 | Wolff |
| 7,395,998 B2 | 7/2008 | Peterson |
| D593,141 S | 5/2009 | Gaudron |
| 7,540,458 B2 | 6/2009 | Forbes |
| 7,547,171 B2 | 6/2009 | McDuff |
| D596,930 S | 7/2009 | Gaudron |
| D605,933 S | 12/2009 | Gaudron |
| D607,311 S | 1/2010 | Snider |
| 7,694,401 B2 | 4/2010 | Peterson |
| 7,713,013 B2 | 5/2010 | Sedgwick et al. |
| D626,403 S | 11/2010 | Portz |

(56) References Cited

U.S. PATENT DOCUMENTS

| | | |
|---|---|---|
| D630,088 S | 1/2011 | Kim |
| D630,089 S | 1/2011 | Kim |
| D635,843 S | 4/2011 | McDuff et al. |
| D636,256 S | 4/2011 | McDuff et al. |
| D642,900 S | 8/2011 | McDuff et al. |
| D649,022 S | 11/2011 | McDuff et al. |
| D649,023 S | 11/2011 | McDuff et al. |
| D649,436 S | 11/2011 | McDuff et al. |
| D649,437 S | 11/2011 | McDuff et al. |
| D649,438 S | 11/2011 | McDuff et al. |
| D649,439 S | 11/2011 | McDuff et al. |
| D650,261 S | 12/2011 | McDuff et al. |
| 8,303,224 B2 | 11/2012 | McDuff et al. |
| 8,414,239 B2 | 4/2013 | McDuff |
| 2001/0046429 A1 | 11/2001 | Gaudron |
| 2002/0171017 A1 | 11/2002 | McKeirnan et al. |
| 2006/0134375 A1 | 6/2006 | Peterson |
| 2006/0182517 A1 | 8/2006 | McDuff |
| 2007/0124910 A1 | 6/2007 | Peterson et al. |
| 2007/0235622 A1 | 10/2007 | Baran et al. |
| 2008/0115343 A1 | 5/2008 | Peterson |
| 2008/0253860 A1 | 10/2008 | McDuff et al. |
| 2009/0003962 A1 | 1/2009 | McDuff et al. |
| 2009/0269158 A1 | 10/2009 | McDuff et al. |
| 2010/0005756 A1 | 1/2010 | McDuff et al. |
| 2012/0001039 A1 | 1/2012 | McDuff et al. |
| 2012/0001040 A1 | 1/2012 | McDuff et al. |

FOREIGN PATENT DOCUMENTS

| | | |
|---|---|---|
| CA | 2458320 A1 | 8/2004 |
| CA | 2420718 | 9/2004 |
| CH | 491296 | 5/1970 |
| CN | 1384293 A | 12/2002 |
| EP | 0713981 A1 | 5/1996 |
| JP | 7174124 A | 7/1995 |
| JP | 2003531344 A | 10/2003 |
| WO | 96/02170 | 2/1996 |
| WO | 96/16273 | 5/1996 |
| WO | 9905419 A1 | 2/1999 |
| WO | 2004079209 A1 | 9/2004 |

OTHER PUBLICATIONS

International Search Report for PCT/CA2006/000419 mailed Jul. 6, 2006.

International Search Report for PCT/CA2006/000428 mailed Jul. 13, 2006.

International Search Report for PCT/US2003/039974 mailed Jul. 16, 2004.

Office Action mailed May 8, 2009 in Chinese Application No. CN 2006800136128, with English translation.

Office Action mailed Sep. 6, 2011 in Japanese Application No. JP 2008-502203, with English translation.

International Search Report for PCT/CA2009/001572 mailed Jan. 15, 2010.

International Search Report for PCT/CA2009/001669 mailed Feb. 3, 2010.

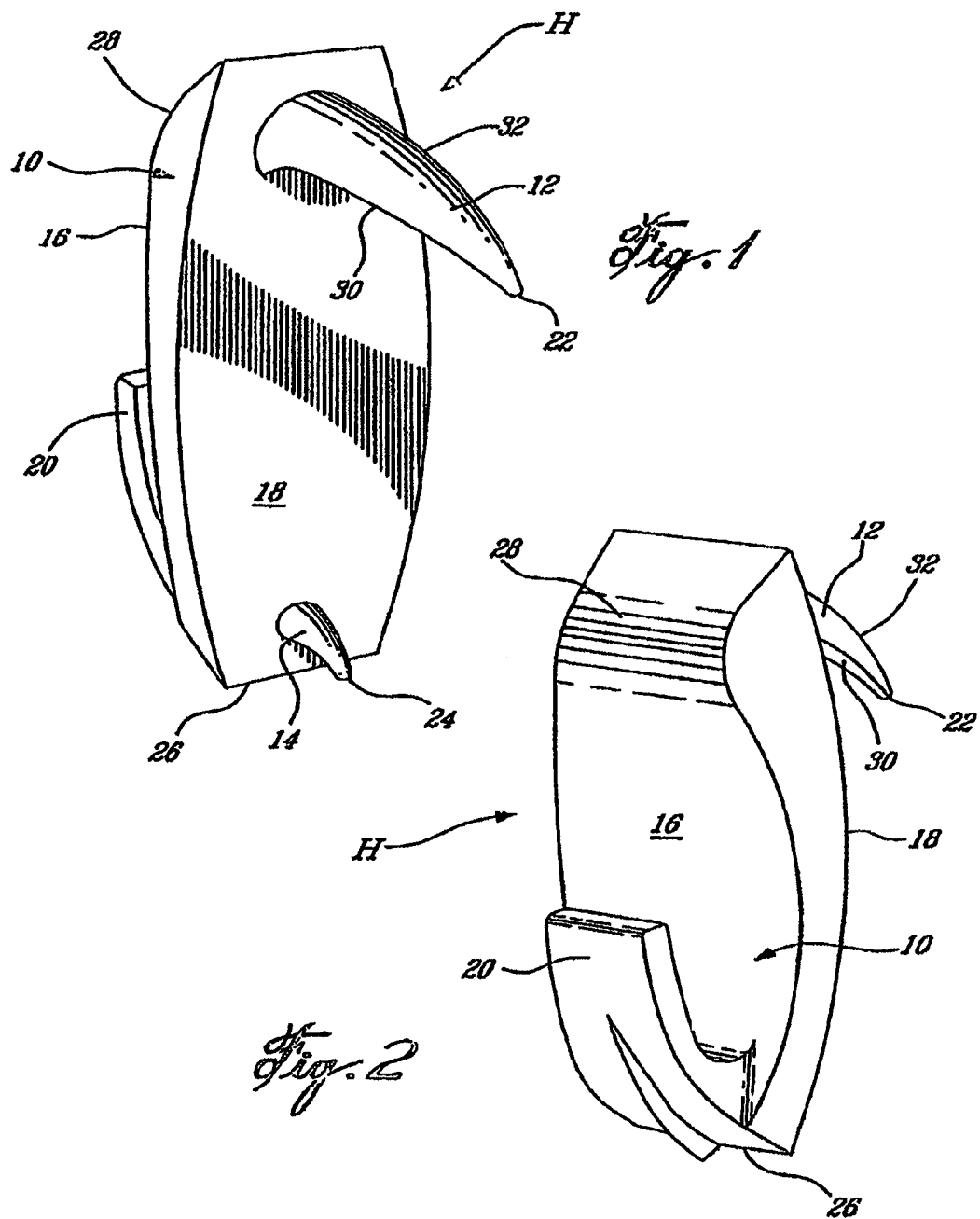

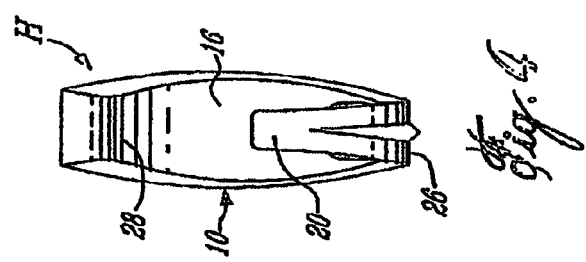
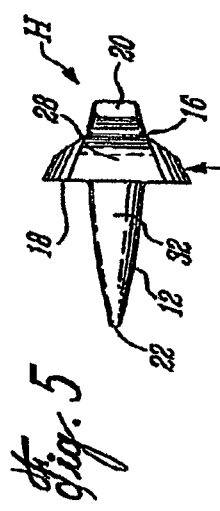
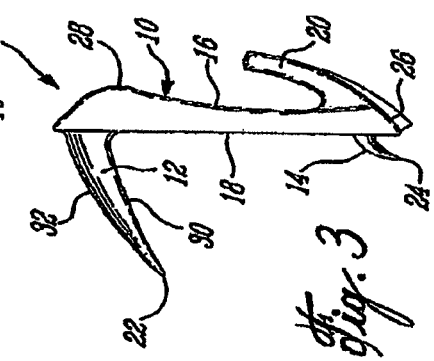
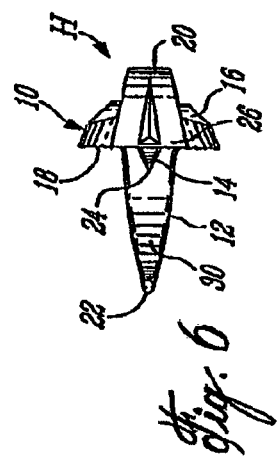
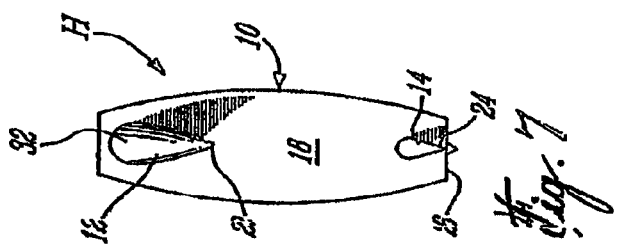

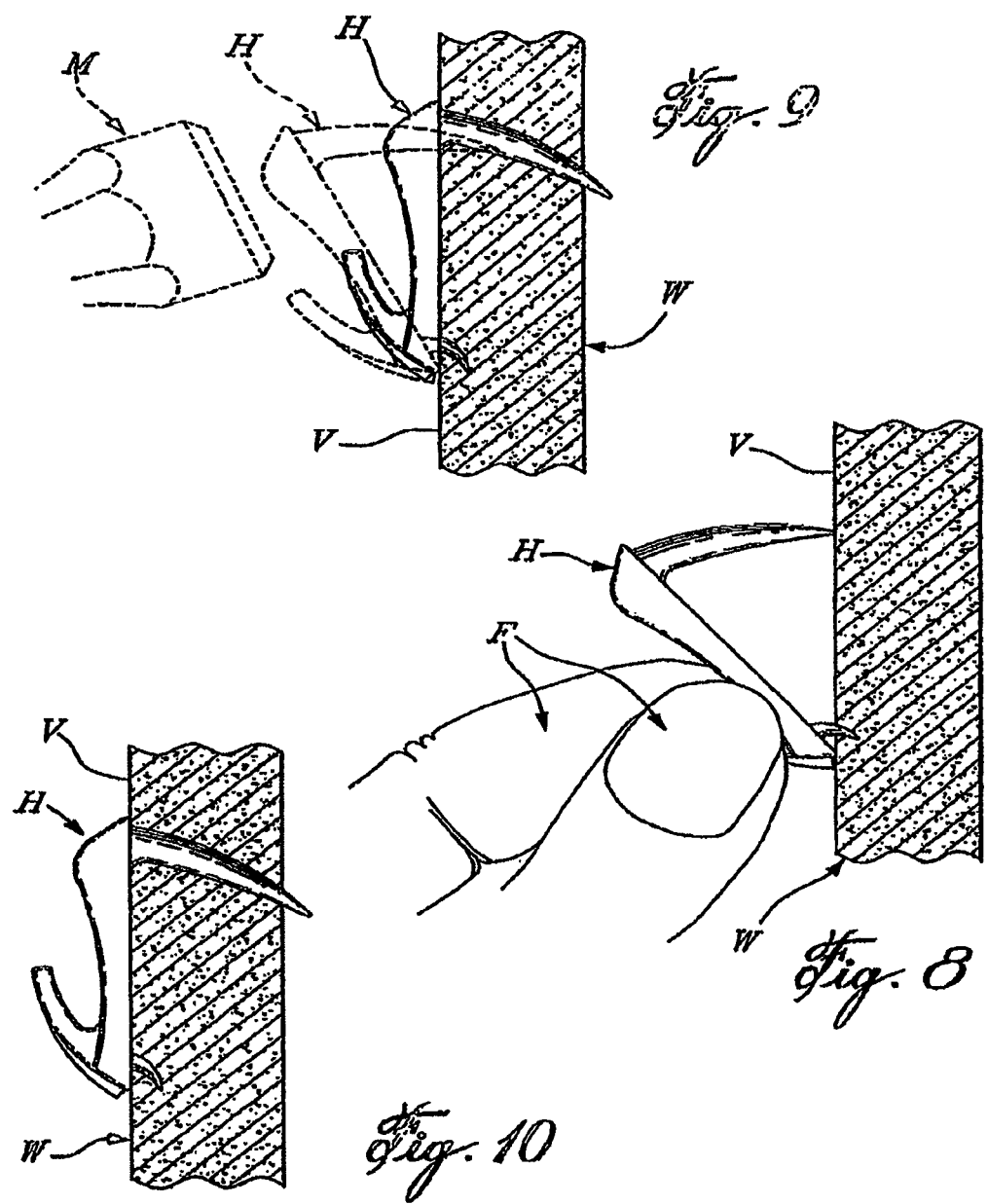

WALL ANCHOR

RELATED APPLICATION

This application is a continuation of co-pending application Ser. No. 12/487,500 filed Jun. 18, 2009, which is a continuation of application Ser. No. 10/548,112 filed on Feb. 16, 2006, which claims priority from PCT Application No. PCT/CA2004/000329, filed on Mar. 4, 2004, which itself claims priority from Canadian Application No. 2,420,722, filed on Mar. 4, 2003. The application is commonly assigned and incorporated by reference herein.

FIELD OF THE INVENTION

The present invention relates to wall fixtures and, more particularly, to a wall anchor for use in different materials including friable materials, e.g. gypsum.

BACKGROUND OF THE INVENTION

There are various wall anchors available on the market, including plastic inserts which are hammered in a hole previously defined in a wall, wherein a fastener, such as a screw, is then engaged in the plastic insert, causing it to expand such that the assembly of the insert and the fastener is set firmly in the wall.

Toggle bolts also exist, wherein rotation of a bolt causes wings to deploy behind the wall and to ultimately abut the inside of the wall thereby firmly anchoring the bolt to the wall.

Both these types of anchors necessitate that a hole be previously drilled in the wall. On the other hand, there exists wall anchors defining a pointed cutting end and large threads, which are adapted to, in a single step, be rotatively driven in the wall thereby drilling their own hole in the wall with the large threads of the anchor compacting the gypsum and becoming firmly set therein. These types of anchors must be installed by way of a screwdriver and typically by a power driven screwdriver bit.

SUMMARY OF THE INVENTION

It is therefore an aim of the present invention to provide a novel wall anchor of simple construction and simple installation.

Therefore, in accordance with the present invention, there is provided a device for mounting to a substantially vertical support, typically to friable walls, comprising a body adapted to be located on a visible side of a substantially vertical support in which said device is to be mounted and at least one saber tooth extending rearwardly from said body and adapted to be driven into the substantially vertical support for securing said device thereto.

More particularly, said saber tooth is arcuate and is adapted to be arcuately driven into the substantially vertical support.

Specifically, said saber tooth extends rearwardly and downwardly from an upper portion of said body and is pointed at a rear free end thereof.

Typically, said saber tooth includes a lower enlarged load bearing surface for bearing against material of the support, and more particularly said enlarged load bearing surface of said saber tooth includes a substantially flat portion.

Said saber tooth may define an upper transversally curved surface.

Furthermore, a secondary saber tooth extends rearwardly from a lower portion of said body for insertion into the support before said saber tooth of said upper portion is inserted therein.

Typically, said secondary saber tooth is arcuate and is pointed at a rear free end thereof.

For example, a hook member is provided on a front part of said body for suspending items therefrom once said device has been mounted to the vertical support.

Generally, said body defines a front striking surface located substantially opposite said saber tooth and adapted to be forcibly acted on: for inserting said saber tooth in the support.

Also in accordance with the present invention, there is provided a method for suspending an item to a substantially vertical support, typically to friable walls, comprising the steps of: (a) providing a wall mountable device having a body and at least one main saber tooth extending rearwardly from said body; (b) positioning said main saber tooth against the support; and (c) exerting force on said body for inserting said main saber tooth into the support and thereby securing said device thereto.

BRIEF DESCRIPTION OF THE DRAWINGS

Having thus generally described the nature of the invention, reference will now be made to the accompanying drawings, showing by way of illustration a preferred embodiment thereof, and in which:

FIG. 1 is a rear perspective view of a wall mounted hook in accordance with the present invention;

FIG. 2 is a front perspective view of the wall mounted hook of FIG. 1;

FIG. 3 is a left side elevational view of the wall mounted hook of FIG. 1;

FIG. 4 is a front elevational view of the wall mounted hook of FIG. 1;

FIG. 5 is a top plan view of the wall mounted hook of FIG. 1;

FIG. 6 is a bottom plan view of the wall mounted hook of FIG. 1;

FIG. 7 is a rear elevational view of the wall mounted hook of FIG. 1;

FIG. 8 is a left side elevational view, partly in cross section, showing a first installation step of the wall mounted hook of FIG. 1 as the latter is being mounted to a wall;

FIG. 9 is a left side elevational view, partly in cross section, showing a second installation step of the wall mounted hook, which follows the first step shown in FIG. 8; and FIG. 10 is a left side elevational view, in cross section, showing the wall mounted hook of FIG. 1 in an installed position thereof in the wall, which follows the second step shown in FIG. 9.

DESCRIPTION OF THE PREFERRED EMBODIMENTS

FIGS. 1 to 7 illustrate a one-piece wall mounted hook H in accordance with the present invention, which can be made of various materials. The hook H comprises a body 10 adapted to be visible when the hook H is mounted to a wall W (see FIGS. 8 to 10), and upper and lower saber teeth 12 and 14, respectively, adapted to engage the wall W for securing the hook H thereto.

The body 10 includes a visible, typically decorative, front surface 16 and a plane rear surface 18. The rear surface 18 is adapted to extend against a visible side V of the wall W once the hook H has been mounted thereto. The front surface 16 is provided, for instance, with a hook member 20 from which an article, e.g. a picture frame, clothes, etc., can be suspended.

The upper and lower saber teeth 12 and 14 are each curved downwardly and terminate rearwardly with respective pointed tips 22 and 24.

The hook H is easily installed as fallows. With reference to FIGS. 8 to 10, the hook H is held with one's fingers F (see FIG. 8) and the body 10 is pressed by hand against the visible side V of the wall W such that the lower saber tooth 14 pierces into the wall W (e.g. through the paper sheet of a gypsum panel forming the wall and slightly through the powder portion thereof) and becomes lodged therein without simultaneously driving the upper saber tooth 12 into the wall W.

Once the lower saber tooth 14 is in the wall W and with a lower end 26 of the body 10 abutting the wall W, an upper portion of the body 10, such as a striking surface generally located at a location indicated by reference numeral 28, is pressed by hand or possibly impacted with a hammer M, as illustrated in FIG. 9, towards the wall W such that it pivots generally about the lower end 26 with the upper saber tooth 12 being acutely driven into the wall W thereby securely engaging the hook H to the wall W up to the installed position of the hook H illustrated in FIG. 10. The hammer M will generally have to be used in the case of substantially big hooks H, if wood is encountered in the wall W (such as behind the gypsum panel), and if the hook H is inserted directly into a wood component.

A bottom surface 30 of the upper saber tooth 12 is enlarged and flat such as to provide a wide load bearing surface between the upper saber tooth 12 and the wall material (e.g. gypsum), thereby providing resistance to the hook H ripping downwards through the wall material, when a load is suspended from the hook member 20 thereof. A top surface 32 of the upper saber tooth 12 is rounded to facilitate the insertion of the upper saber tooth 12 in the wall material.

The hook H can, for instance, be made of zinc so that it can be die-casted.

In a variant (not shown) of the hook H, a conventional leveler (i.e. a horizontally elongated and vertically oriented plate defining saw teeth along its lower edge and having elbowed wings at the longitudinal ends thereof that can be nailed to an article, e. g. picture, such that the picture can be mounted to the wall by suspending the leveler attached thereto from a fastener, e.g. a nail, previously secured to the wall) is provided at each of its elbowed wings with a rearwardly extending upper saber tooth. A V-shaped member that extends downwardly from the horizontal plate or from the elbowed wings has a lower saber tooth extending rearwardly therefrom. This variant can thus be secured to an article, i.e. a rear surface of a picture, by first pressingly engaging the lower saber tooth in the article, followed by pressingly engaging the upper saber teeth therein. In such a case, the upper and lower saber teeth replace the conventional nails that are inserted through holes defined in the leveler's wings and into the rear of the picture to be hung from the wall.

What is claimed is:

1. A device for mounting to a substantially vertical support, typically to friable walls, comprising a body adapted to be located on a visible side of a substantially vertical support in which said device is to be mounted, at least one rigid saber tooth extending rearwardly and downwardly from an upper portion of said body and being rigidly connected thereto, said saber tooth being adapted to be driven into the substantially vertical support for securing said device thereto, and a secondary saber tooth extending rearwardly and downwardly from a lower portion of said body.

2. A device as defined in claim 1, wherein said saber tooth is arcuate and is adapted to be arcuately driven into the substantially vertical support.

3. A device as defined in claim 1, wherein said secondary saber tooth is adapted to be inserted into the support before said saber tooth of said upper portion is inserted therein.

4. A device as defined in claim 1, wherein said secondary saber tooth is arcuate, pointed at a rear free end thereof and rigidly connected to the body.

5. A device as defined in claim 1, wherein said saber tooth includes a lower enlarged load bearing surface for bearing against material of the support.

6. A device as defined in claim 5, wherein said enlarged load bearing surface of said saber tooth includes a substantially flat portion.

7. A device as defined in claim 1, wherein said saber tooth includes an upper transversally curved surface.

8. A device as defined in claim 1, wherein a hook member is provided on a front part of said body for suspending items therefrom once said device has been mounted to the vertical support.

9. A device as defined in claim 1, wherein said body comprises a horizontally elongated and vertically oriented plate defining saw teeth along a lower edge thereof with elbowed wings being provided at longitudinal ends thereof, one said saber tooth being provided at each of said elbowed wings and extending rearwardly therefrom for insertion into the support.

10. A device as defined in claim 9, wherein said body further comprises a V-shaped member extending downwardly from one of said horizontal plate and said elbowed wings, a secondary saber tooth extending rearwardly from a lower section of said V-shaped member.

11. A device as defined in claim 1, wherein said body defines a front striking surface located substantially opposite said saber tooth and adapted to be forcibly acted on for inserting said saber tooth in the support.

12. A device as defined in claim 1, wherein a front part of said body is provided with a member adapted for engagement with an article such that the article can be mounted to the vertical support via said device.

13. A device as defined in claim 1, wherein said saber tooth is pointed at a rear free end thereof.

14. A device as defined in claim 1, wherein said device is made in one piece.

15. A device as defined in claim 1, wherein there are provided a single saber tooth on said upper portion of said body and a single secondary saber tooth on said lower portion of said body.

* * * * *